United States Patent [19]

Wu

[11] Patent Number: 5,066,265

[45] Date of Patent: Nov. 19, 1991

[54] CHAIN

[76] Inventor: Chia L. Wu, No. 734, Chung Shan Rd., Kwei Jen Hsiang, Tainan Hsien, Taiwan

[21] Appl. No.: 637,293

[22] Filed: Jan. 3, 1991

[51] Int. Cl.⁵ .............................................. F16G 13/00
[52] U.S. Cl. .................................... 474/206; 474/212
[58] Field of Search .......................... 474/206, 209–217

[56] References Cited

U.S. PATENT DOCUMENTS 1,119,582  12/1914  Dodge .................................. 474/213
4,741,725   5/1988  Ingold .................................. 474/212
4,983,147   1/1991  Wu ....................................... 474/206

*Primary Examiner*—Thuy M. Bui
*Attorney, Agent, or Firm*—Renner, Otto, Boisselle & Sklar

[57] ABSTRACT

A chain is a combination of a plurality of links, each link comprising a pair of outer and inner chain plates and rollers, each chain plate being dumb-bell-shaped and providing an inclined surface along an upper and lower edge of an inner surface thereof from one lateral end to another, the inclined surface having a blade portion with greater slope in a central straight portion of the chain plate.

2 Claims, 7 Drawing Sheets

CHAIN

BACKGROUND OF THE INVENTION

This invention relates to an improved chain, especially to a chain used on a bicycle.

Typically, a multi-geared bicycle has a plurality of sprocket wheels and a gear cluster connected by a chain and controlled by a derailleur. On a modern bicycle there may be up to three sprocket wheels and a gear cluster with up to seven gears to obtain get a possible 21 different gear ratios to suit different road conditions.

Referring to the prior art of FIG. 9, when a rider shifts up, i.e., shifting to a higher gear ratio, a chain with a space A defined by two inner chain plates or a space B defined by two outer chain plates is received by a tooth 10 of a smaller diameter sprocket; or shifts down, i.e., shifting to a lower gear ratio, the chain is received on a sprocket with a larger diameter from one of a smaller diameter, suiting different road conditions, such as flat or hilly. A conventional derailleur cooperating with a traditional chain does not allow the rider to shift quickly. Referring to FIG. 12, it is found that while the rider is shifting, a top surface 40 of the tooth of the sprocket abuts a lateral face 30 of the chain plate; thus, the sprocket can not insert immediately into the space of the chain, delaying the rider since he has to continuously pedal to make the sprocket engage with the chain.

In addition, since the distance between two inner chain plates is shorter than that between two outer chain plates, referring to FIG. 11, while in a highest gear ratio the chain 30 is oblique to sprockets 201 and 101, thus when the sprocket inserts a tooth into a space between two inner chain plates, it is possible (referring FIG. 10), that the top surface of the tooth of the sprocket will rest on an upper face 60 of a central portion of the inner chain plate, resulting in the chain skidding from the sprocket in a direction as shown by arrow F.

It is the purpose of this present invention, therefore, to mitigate and/or obviate the above-mentioned drawback in the manner set forth in the detailed description of the preferred embodiment.

SUMMARY OF THE INVENTION

This invention provides an improved chain which is a combination of a plurality of links, each link has a pair of rollers, a pair of inner chain plates, and a pair of outer chain plates.

Each chain plate is dumbbell-shaped and provides inward inclined surfaces along an upper and lower edge thereof, from one lateral end to the other. At a central straight portion of the chain plate, the inclined surface is broader and provides a blade portion having a greater slope adjacent to an edge of the central straight portion of the chain plate. One of the outer chain plates provides an inward central chain pin on a circular portion thereof, while the other chain plate provides corresponding receiving holes therein. Each inner chain plate has a hole surrounded by an inward flange on a center of the circular portion thereof.

Thus, after combining all of the elements above-mentioned, a link of the chain will provide an curved surface, and an inlet width between two inner chain plates is larger than that of a traditional chain.

Therefore, it is an object of this invention to provides a link chain that facilitates the engagement of a chain with a sprocket while shifting.

It is another object of this invention to provide a link which prevents the chain from skidding off a sprocket when in a highest gear ratio.

DETAILED DESCRIPTION OF THE PREFERRED EMBODIMENT

Figure 1:
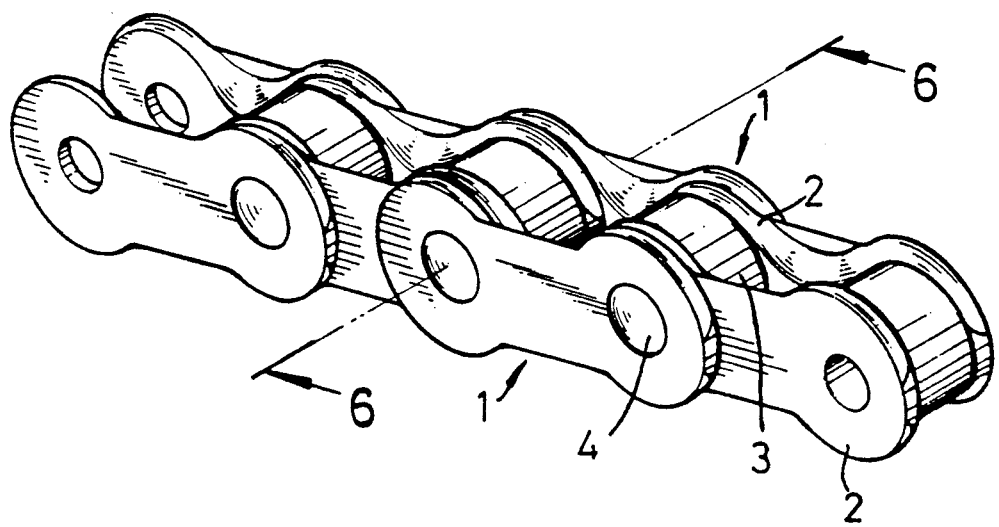
FIG. 1 is a perspective view showing a segment of a chain in accordance with the present invention.
Figure 2:
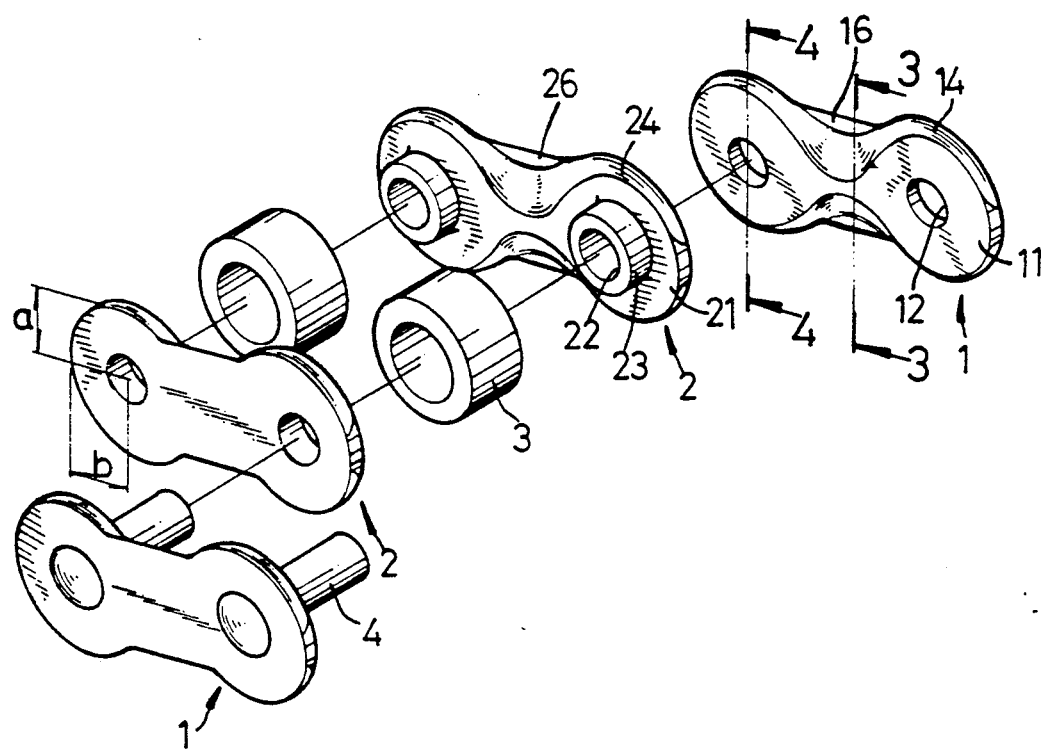
FIG. 2 is an exploded view of a link of a chain in accordance with this invention.
Figure 3:
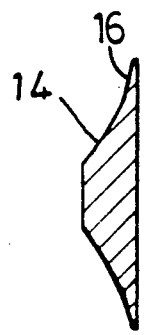
FIG. 3 is a cross-sectional view taken along 3—3 line in FIG. 2.

Referring to FIG. 1, a segment of a chain in accordance with the present invention is seen. The chain is composed of a plurality of links. Referring to FIG. 2, a link of the chain includes a pair of outer chain plates 1, a pair of inner chain plates 2, and a pair of rollers 3.

Figure 4:
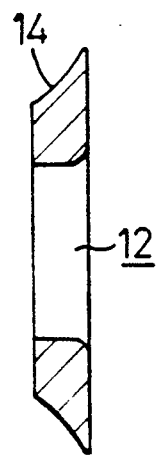
FIG. 4 is a cross-sectional view taken along 4—4 line in FIG. 2.

From a side view, each outer and inner chain plate 1 and 2 is shaped like a dumbbell. On an inner face 11 of each outer chain plate 1 there is provided an inclined surface 14, which extends along an upper and a lower edge of each outer chain plate 1, from one lateral end thereof to another. Thus, in a cross-sectional view of a lateral circular portion of an outer chain plate 1, referring to FIG. 4, there is provided upper and lower inclined surfaces 14 on an inner surface and a smooth flat on an outer surface.

At central straight portions of the inner faces 11 of the outer chain plates 1, the inclined surfaces 14 provide blade portions 16. The blade portions 16 substantially comprise outer edges of the central straight portions of the inner faces 11. The blade portions 16 also have a greater slope than the inclined surfaces 14; thus, the outer chain plates 1 provide two successive inclined surfaces at the central straight portion thereof, i.e., the blade portion 16 and the inclined surface 14.

One of the outer chain plates of the link provides a hole connected with an inward chain pin 4 at centers of each circular portion thereof, while the other chain plate provides two corresponding receiving holes 12 to receiving pins 4.

Figure 5:
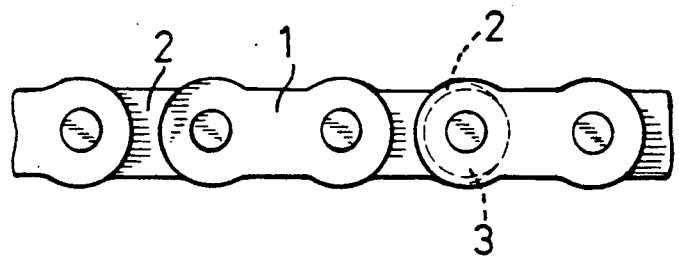
FIG. 5 is a front elevation view of this invention.

Portions of the inner chain plates 2 corresponding to the outer chain plates 1 and differences thereof are briefly described below. Circular portions of the inner chain plates 2 have a smaller diameter than that of the outer chain plates 1. A pair of inward protuberant flanges 23 are disposed on each inner chain plate 2, surrounding a central hole 22 on each circular portion thereof. More particularly, in the circular portions, the vertical radius (a) is larger than the horizontal radius (b), such as shown in FIG. 2 and FIG. 5, where a circular portion of an inner chain plate 2 and a roller 3 are shown in phantom line.

Further, a second blade portion 26 is provided on an upper straight edge of the inner chain plate 2; therefore, a space between two inner chain plates 2 more easily accommodates an entering sprocket by providing a larger width at the upper straight edge than conventional chains.

Figure 6:
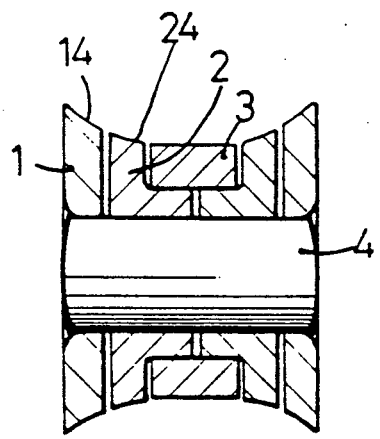
FIG. 6 is a cross-sectional view taken along 6—6 line in FIG. 1.

All elements may be assembled into a link in a conventional manner; thus, at a combined portion the inner and outer chain plates 1 and 2 provide respective inclined surfaces 14 and 24, cooperating with rollers 3, to form a curved surface, such as shown in FIG. 6. Then a plurality of links may be combined to form a chain.

Figure 7:
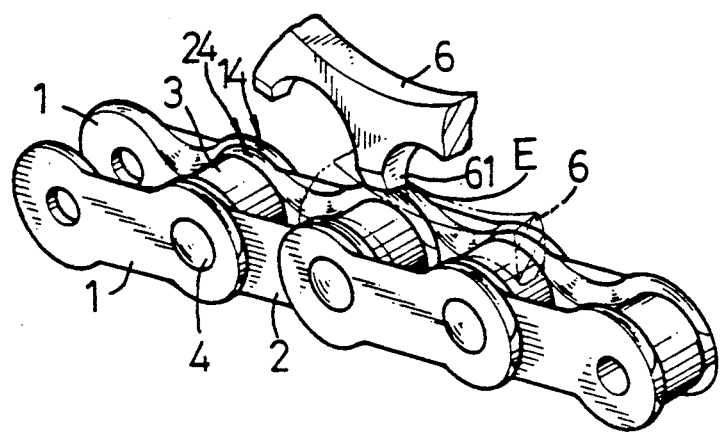
FIG. 7 is a perspective view illustrating a sprocket inserting into a space between two outer chain plates of a chain in accordance with this invention.
Figure 8:
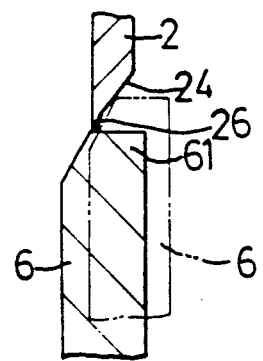
FIG. 8 is a cross-sectional view illustrating a sprocket abutting a straight portion of an inner chain plate and sliding into a space of a chain.
Figure 9:
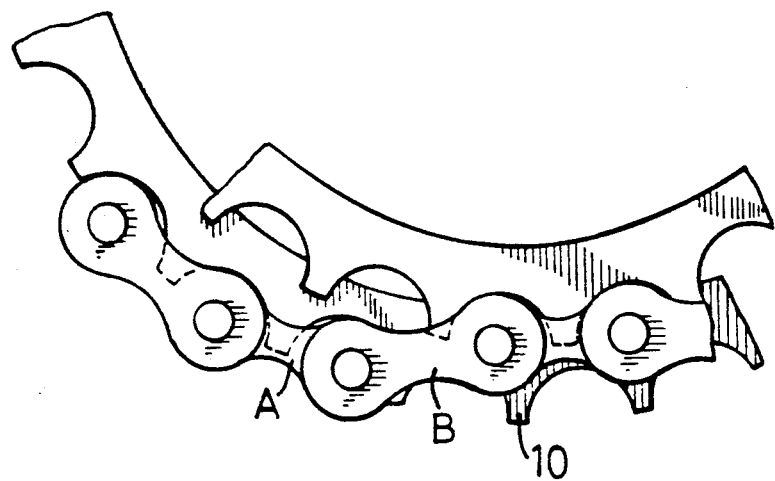
FIG. 9 shows a diagrammatic representation of a segment of a chain and sprockets while shifting according to prior art.
Figure 10:
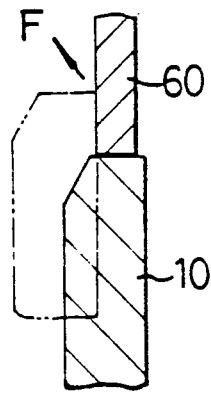
FIG. 10 shows a cross-sectional view illustrating a sprocket abutting a joint of a chain while shifting according to prior art.
Figure 11:
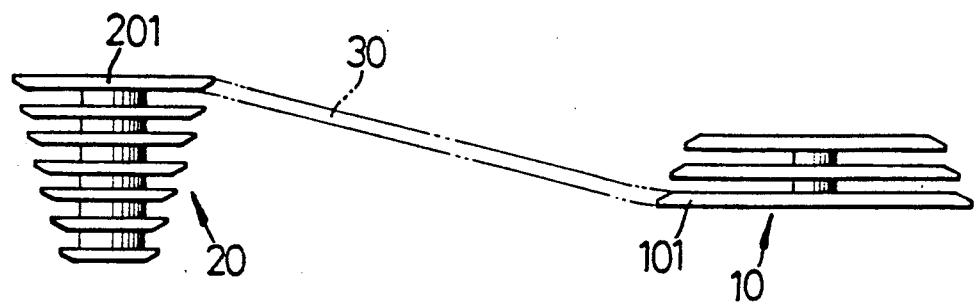
FIG. 11 shows a diagrammatic representation of a chain in a highest gear ratio.
Figure 12:
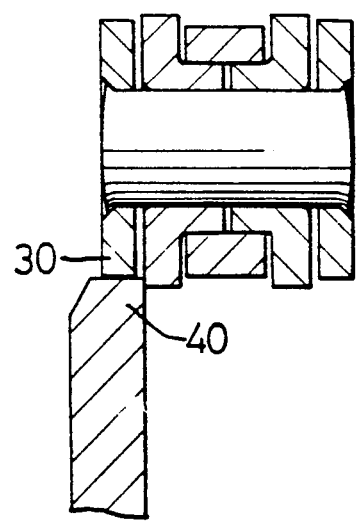
FIG. 12 shows a cross-sectional view illustrating a sprocket resting on a central straight portion of the inner chain plate of a chain while shifting according to prior art.

In operation, referring to FIGS. 7 and 8, a tooth 61 of a sprocket 6 may abut an edge, indicated at E, of the inclined surface 14, and then slide along the curved surface into a space defined by either outer or inner chain plates of the chain to complete shifting.

Additionally, while in a condition of being in the highest gear ratio, and since there is a larger width provided between two chain plate, the tooth 61 of the sprocket 6 may abut an edge the central straight portion of the inner chain plate 2, causing the tooth 61 to slide from blade portion 16 through the inclined surface 14 into a space defined by two inner chain plates 2, instead of skidding out and off the chain.

It is to be understood, however, that even though numerous characteristics and advantages of the present invention have been set forth in the foregoing description, together with details of the structure and function of the invention, the disclosure is illustrative only, and changes may be made in detail within the principles of the invention to the full extent indicated by the broad general meaning of the terms in which the appended claim as expressed.

I claim:

1. A chain comprising a plurality pairs of inner and outer chain plates linked by rollers and pins, wherein the improvement comprises:

each said chain plate having a flat outer surface and an inclined surface along upper and lower edges of an inner face thereof, said inclined surface extending from first ends to second ends of said chain plates, said chain plates each having a blade portion merging with said inclined surface at central straight portions thereof, said blade portions having a greater slope than said inclined surfaces, thereby enlarging a width between two inner chain plates.

2. A chain as claimed in claim 1, wherein said inclined surface of said inner chain plate is positioned successively to said inclined surface of said outer chain plate to form a curved surface thereon at a junction thereof.

* * * * *